(12) United States Patent
Nakazato

(10) Patent No.: US 9,621,892 B2
(45) Date of Patent: Apr. 11, 2017

(54) EMULATION OF BI PREDICTED PICTURES USING ADJACENT PICTURES FOR IMPROVED VIDEO

(75) Inventor: Munehiro Nakazato, Sunnyvale, CA (US)

(73) Assignee: SONY CORPORATION, Tokyo (JP)

(*) Notice: Subject to any disclaimer, the term of this patent is extended or adjusted under 35 U.S.C. 154(b) by 1180 days.

(21) Appl. No.: 12/642,483

(22) Filed: Dec. 18, 2009

(65) Prior Publication Data

US 2011/0150092 A1  Jun. 23, 2011

(51) Int. Cl.
| | |
|---|---|
| H04N 19/105 | (2014.01) |
| H04N 19/176 | (2014.01) |
| H04N 19/16 | (2014.01) |
| H04N 19/577 | (2014.01) |

(52) U.S. Cl.
CPC ........... *H04N 19/105* (2014.11); *H04N 19/16* (2014.11); *H04N 19/176* (2014.11); *H04N 19/577* (2014.11)

(58) Field of Classification Search
CPC .. H04N 19/105; H04N 19/176; H04N 19/577; H04N 19/16
USPC .................................................... 375/240.15
See application file for complete search history.

(56) References Cited

U.S. PATENT DOCUMENTS

| | | | |
|---|---|---|---|
| 5,341,174 A * | 8/1994 | Xue et al. .................. 348/576 |
| RE38,563 E * | 8/2004 | Eifrig et al. ................ 382/236 |
| 6,970,640 B2 * | 11/2005 | Green et al. ................. 386/346 |
| 6,980,596 B2 * | 12/2005 | Wang et al. ............. 375/240.16 |
| 7,463,685 B1 * | 12/2008 | Haskell et al. .......... 375/240.12 |
| 7,567,617 B2 * | 7/2009 | Holcomb ................. 375/240.13 |
| 7,817,718 B2 * | 10/2010 | Wang et al. ............. 375/240.16 |
| 8,064,520 B2 * | 11/2011 | Mukerjee et al. ....... 375/240.15 |
| 2002/0172284 A1 * | 11/2002 | Peng et al. ............... 375/240.15 |
| 2007/0064801 A1 * | 3/2007 | Wang et al. ............. 375/240.12 |
| 2009/0147848 A1 * | 6/2009 | Park et al. ............... 375/240.13 |

OTHER PUBLICATIONS

Ji, Xiangyang et al.—"New bi-prediction techniques for B pictures Coding"—IEEE Intl. Conf. on Multimedia and Expo (ICME) 2004; Jun. 27-30, 2004; vol. 1; pp. 101-104.

(Continued)

*Primary Examiner* — Behrooz Senfi
*Assistant Examiner* — Maria Vazquez Colon
(74) *Attorney, Agent, or Firm* — O'Banion & Ritchey LLP; John P. O'Banion

(57) ABSTRACT

A method and apparatus for emulation of Bi predicted B pictures is described where a B picture is constructed only from information from one preceding and successive frame without pixel averaging or motion vector computation. In the case of H.264 or analogous codecs, a top field of a B picture is formed from the successive I or P picture top field, and the bottom field formed from the previous P picture bottom field. B picture emulation may reverse the previous and successive pictures. For interlaced pictures, the odd and ever interlacing fields are treated as top and bottom fields, and also use information from both one preceding and successive frame. The resulting Bi predicted B pictures reduce inter-GOP flicker.

32 Claims, 6 Drawing Sheets

(56) References Cited

OTHER PUBLICATIONS

Flierl, M. et al.—"Generalized B pictures and the draft H.264/AVC video-compression standard"—IEEE Transactions on Circuits and Systems for Video Technology; Jul. 2003; vol. 13, Issue 7; pp. 587-597.

Wiegand, T. et al.—"Overview of the H.264/AVC video coding standard"—IEEE Transactions on Circuits and Systems for Video Technology; Jul. 2003: vol. 13, Issue 7; pp. 560-576.

* cited by examiner

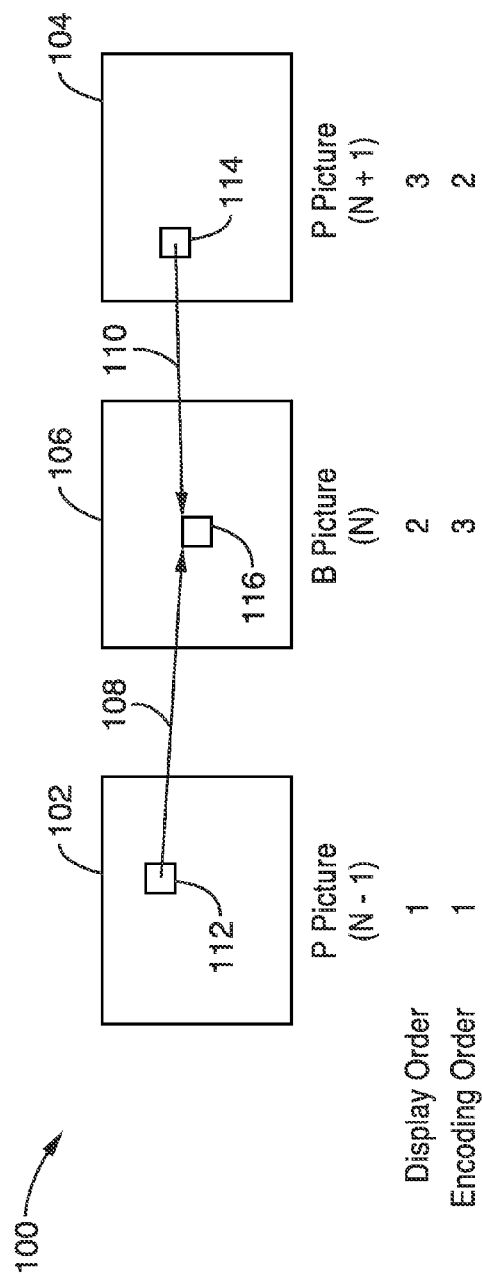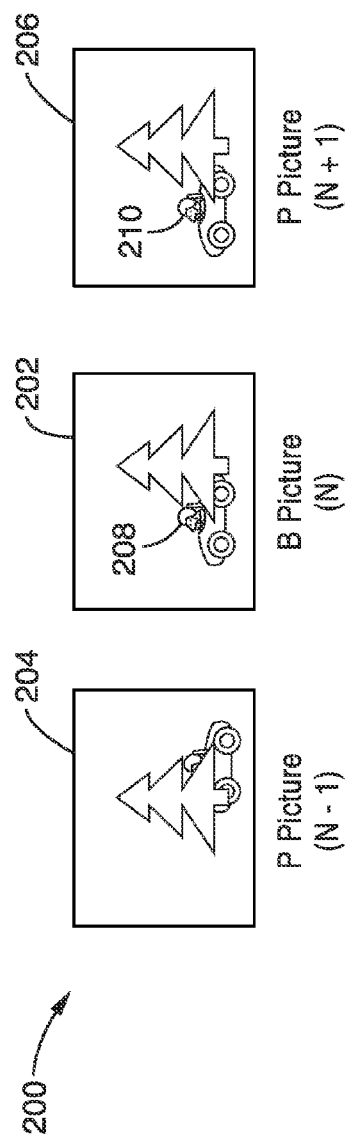

though processing may be performed without operations selected from a set of operations comprising: averaging, addition, multiplication, division, subtraction, and combinations of the foregoing. In one embodiment, the selection may be performed merely by reordering subsets of data already present in the two sequential frames.

EMULATION OF BI PREDICTED PICTURES USING ADJACENT PICTURES FOR IMPROVED VIDEO

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention pertains generally to processing pictures, and more particularly to generating and displaying bidirectional prediction pictures, and more particularly to generating and displaying bidirectional prediction pictures using portions of succeeding and prior frames.

2. Description of Related Art

In most video codec systems such as MPEG-2, MPEG-4 and H.264, Bi directional prediction (Bi prediction) is used. Pictures that contain bi-directionally predicted macroblocks are referred to as B pictures, B frames, or B slices. The bi-directional prediction creates a predicted picture from two motion vectors and encoded reference pictures.

In MPEG-2 and MPEG-4, those two reference pictures are motion compensated independently first, then averaged pixel by pixel. In H.264, the weighted prediction mode was introduced where two reference pictures are blended with weights. Because Bi prediction uses two previously encoded pictures, blocks can be encoded efficiently and require fewer bits. Therefore, B slices are often used as a means for reducing bit rates.

The following publications provide useful context for video compression standards, and are hereby incorporated by reference in their entireties.

[1] Flierl, M. and Girod, B., "Generalized B pictures and the draft H.264/AVC video-compression standard," In IEEE Transactions on Circuits and Systems for Video Technology, Volume 13, Issue 7, Date: July 2003, Pages: 587-597.

[2] Wiegand, T., Sullivan, G. J., Bjøntegaard, G. and Luthra, A., "Overview of the H.264/AVC video coding standard," In IEEE Transactions on Circuits and Systems for Video Technology, Volume 13, Issue 7, Date: July 2003, Page(s): 560-576.

BRIEF SUMMARY OF THE INVENTION

The present invention is an image processing apparatus and method for emulating a B frame.

One aspect of the invention is an image processor; said image processor configured for processing two sequential frames comprising a previous and a subsequent frame; said image processor configured to emulate a B frame from said previous and subsequent frames. In one embodiment, the previous and subsequent frames emulate the B frame. In one embodiment, this selection of data from the sequential frames may be performed without operations selected from a set of operations comprising: averaging, addition, multiplication, division, subtraction, and combinations of the foregoing. In one embodiment, the selection may be performed merely by reordering subsets of data already present in the two sequential frames.

In one embodiment, a bottom field of the B frame may be emulated from a bottom field of the previous frame, and a top field of the B frame may be emulated from a top field of the subsequent frame. Alternatively, a bottom field of the B frame may be emulated from a bottom field of the subsequent frame, and a top field of the B frame may be formed from a top field of the previous frame.

In one embodiment, an odd field of the interlaced B frame may be formed from an odd field of the interlaced previous frame; and an even field of the interlaced B frame may be formed from an even field of the interlaced subsequent frame.

In one embodiment, wherein the previous and subsequent frames are interlaced with an even and an odd field; an odd field of the interlaced B frame may be formed from an odd field of the interlaced subsequent frame; and an even field of the interlaced B frame may be formed from an even field of the interlaced previous frame.

In one embodiment, the B frame may be output to a computer readable medium. Ultimately, the computer readable medium may be viewed by a human, as in an output of the computer readable medium to a user. In one embodiment, the B frame may be directly output to a device viewed by a human, such as a TV, DVD, monitor, or other component ultimately viewed by a human.

The previous and the subsequent frames discussed above may be selected from a group of frames consisting of: an I frame, and a P frame.

Another aspect of the invention may comprise: an image processor; said image processor configured for emulating a B frame from data selected in a previous frame and a subsequent frame; wherein said previous frame and said subsequent frame are selected from a group of frames consisting of an I frame and a P frame. In one embodiment, creating the B frame does not require a calculation of motion vectors. Here, the previous and the subsequent frames may each comprise a top field and a bottom field encoded as independent pictures.

According to another aspect of the invention, an apparatus for emulating a B frame may comprise: an image processor; said image processor configured for emulating a B frame between two sequential frames. In one embodiment, the sequential frames may comprise a previous frame and a subsequent frame; wherein a bottom of the B frame is emulated from a bottom field of the subsequent frame; and where a top field of the B frame is emulated from a top field of the previous frame.

In one embodiment, the two sequential I frames comprise a previous frame and a subsequent frame; wherein the previous, subsequent, and B frames are interlaced with an odd and an even field. In one embodiment, the data may be selected from the two sequential I frames without operations selected from a set of operations comprising: averaging, adding, multiplying, dividing, subtracting, and combinations of the foregoing.

In one embodiment a bottom field of the B frame may be emulated from a bottom field of the previous frame; and a top field of the B frame may be emulated from a top field of the subsequent frame. Alternatively, a bottom field of the B frame may be emulated from a bottom field of the subsequent frame; and a top field of the B frame may be emulated from a top field of the previous frame.

For interlaced video streams, an odd field of the interlaced B frame may be emulated from an odd field of the interlaced previous frame; and an even field of the interlaced B frame may be emulated from an even field of the interlaced subsequent frame. Alternatively, an odd field of the interlaced B frame may be emulated from an odd field of the interlaced subsequent frame; and an even field of the interlaced B frame may be emulated from an even field of the interlaced previous frame.

In another embodiment, said output circuitry may generate an output to a computer readable medium. The previous and the subsequent frames may be selected from a group of frames consisting of an I frame and a P frame.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 1 is a chart of overall bi directional prediction and the encoding/display orders.

FIG. 2 is a chart showing how B pictures help better prediction for an occluded area.

DETAILED DESCRIPTION OF THE INVENTION

Definitions

Figure 3:
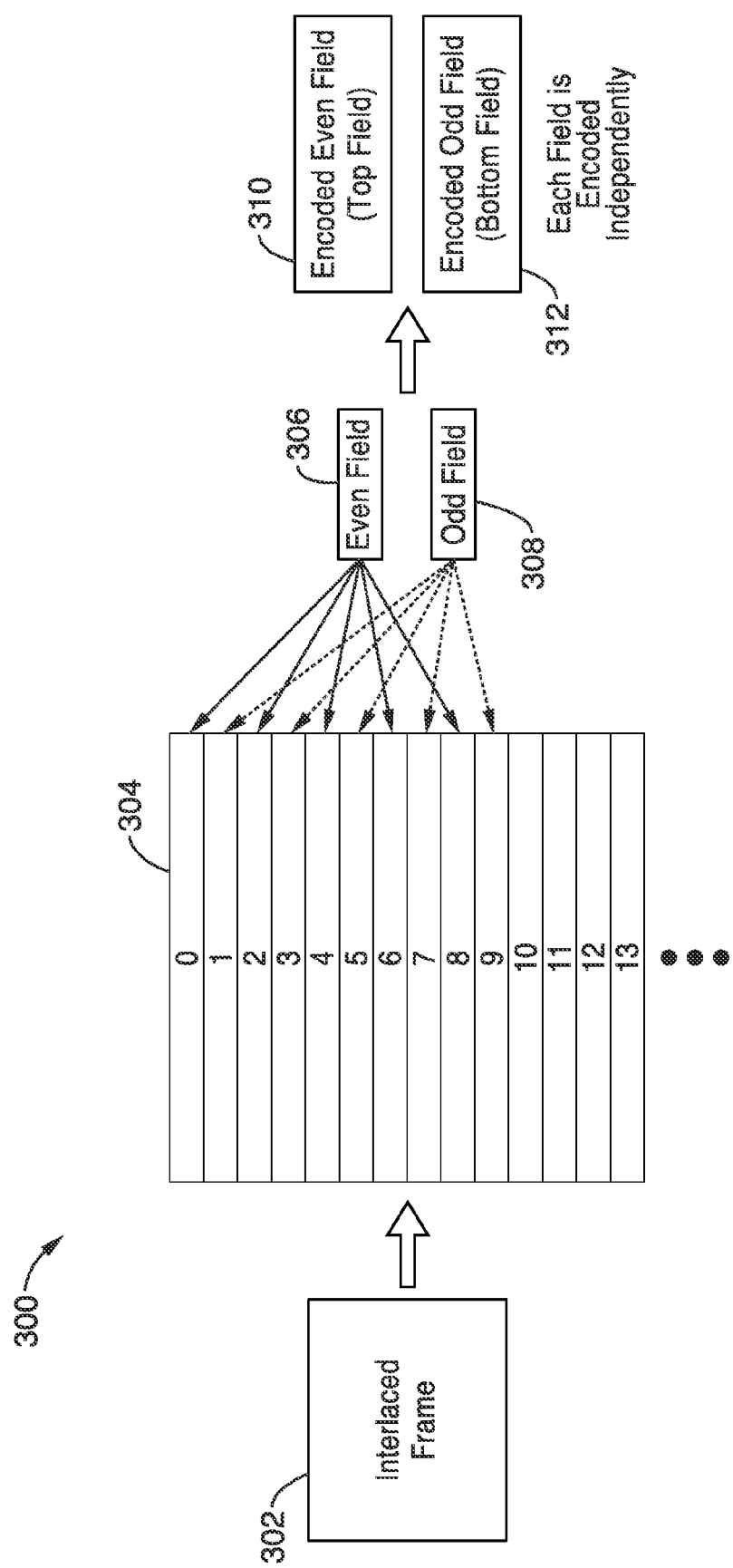
FIG. 3 is a chart showing field encoding for interlaced pictures.

The following terms are used herein and are thus defined to assist in understanding the description of the invention(s). Those having skill in the art will understand that these terms are not immutably defined and that the terms should be interpreted using not only the following definitions but variations thereof as appropriate within the context of the invention(s).

"Codec" means a device or computer program capable of encoding or decoding a digital data stream or signal. The word codec is a portmanteau of "compressor-decompressor" or, more accurately, "coder-decoder". Such digital data streams may contain content such as audio, video, or still pictures.

"Computer" means any device capable of performing the steps, methods, or producing signals as described herein, including but not limited to: a microprocessor, a microcontroller, a video processor, a digital state machine, a field programmable gate array (FPGA), a digital signal processor, a collocated integrated memory system with microprocessor and analog or digital output device, a distributed memory system with microprocessor and analog or digital output device connected by digital or analog signal protocols.

"Computer readable medium" means any source of organized information that may be processed by a computer to perform the steps described herein to result in, store, perform logical operations upon, including but not limited to: random access memory (RAM), read only memory (ROM), a magnetically readable storage system; optically readable storage media such as punch cards or printed matter readable by direct methods or methods of optical character recognition; other optical storage media such as a compact disc (CD), a digital versatile disc (DVD), a rewritable CD and/or DVD; electrically readable media such as programmable read only memories (PROMs), electrically erasable programmable read only memories (EEPROMs), field programmable gate arrays (FPGAs), and flash random access memory (flash RAM).

"Emulate" means to strive to equal or match, especially by imitating, or otherwise approximate.

"Frame" means a single picture or a portion of a single picture. In an interlaced picture, a frame may comprise either the even or odd interlace.

"GOP (Group of Pictures)" means P and/or B-frames between successive I-frames in an MPEG signal. A GOP is usually about 15 frames long in an NTSC system. The length of a GOP can vary depending on editing requirements. The length of a GOP represents the editing capability of an MPEG signal. If an edit occurs within a GOP, an MPEG codec will be needed to reclose the GOP. A GOP must begin with an I-frame and end with an I-frame. Therefore if a cut occurs in the middle of a GOP, the signal needs to be reconstructed with a codec.

"I, P, B frames" mean the three major picture types found in typical video compression designs. They are I(ntra) (or key) pictures, P(redicted) pictures, and B(i-predictive) pictures (or B(i-directional) pictures). They are also commonly referred to as I frames, P frames, and B frames, respectively. In older reference documents, the term "bi-directional" rather than "bi-predictive" is dominant to describe a B frame.

"Image Processor" means any device capable of performing the steps, methods, or producing signals relating to images as described herein, including but not limited to: a microprocessor, a microcontroller, a video processor, a graphical processing unit (GPU), a digital state machine, a field programmable gate array (FPGA), a digital signal processor, a collocated integrated memory system with processor and analog or digital output device, a distributed memory system with microprocessor and analog or digital output device connected by digital or analog signal protocols.

"Pixel" means a single picture element. The smallest element in a picture. Pixels are combined with other pixels to make up a picture. Picture quality increases as the number of pixels increase in a measured area of an image.

"Picture" means a single image.

"Video" means a succession of sequential pictures, as within a Group of Pictures (GOP), such as, but not limited to, a depiction of movement or time variance.

Referring more specifically to the drawings, for illustrative purposes the present invention is embodied in the apparatus generally shown in FIG. 1 through FIG. 6. It will be appreciated that the apparatus may vary as to configuration and as to details of the parts, and that the method may vary as to the specific steps and sequence, without departing from the basic concepts as disclosed herein.

1. Introduction

In video codec standards such as MPEG-2, MPEG-4, SMPTE (Society of Motion Picture and Television Engineers) 421M video codec (VC1), and H.264, bidirectional prediction (Bi prediction) is often used to improve video coding efficiency.

However, in modern video codec standards, Bi prediction requires pixel averaging and complicated computations to derive forward and backward motion vectors as they map into the B frame.

Here, a novel algorithm is used to emulate the effects of Bi prediction by using different sets of reference pictures for the even field and odd field respectively. This algorithm requires about the same computational resources as P pictures. The algorithm does not use pixel averaging or complicated motion vector computation. It only needs to arrange the reference picture structures for each field.

2. Background

2.1 Bi-Directional Prediction

Refer now to FIG. 1, which shows how a B frame is generated 100. Note that, in a video sequence that involves B slices, the display order and the encoding order are different. For example, here, two P pictures 102 and 104 are encoded first, and then the middle B picture 106 is encoded.

This encoding results in P frame 102 first being displayed (picture N−1), then B frame 106 (picture N), and finally P frame 104 (picture N+1). Thus, the encoding order is different than that of the display order.

In modern video codec standards, Bi prediction requires pixel averaging and complicated computations to derive forward 108 and backward 110 motion vectors of respective macroblocks 112 and 114 as they map into the B frame 106 macroblock 116.

Refer now to FIG. 2, which shows a sequence of pictures before and after a B picture 200. Because B pictures can use the succeeding frame in the display order (and yet still be encoded in advance), they tend to handle occlusion better. Here, the car in the middle picture 202 can be better predicted if both the previous 204 and following 206 pictures are available. The head 208 in the car in the B picture 202 is not available from the preceding picture 204, and is in fact only available 210 from the subsequent picture 206.

B pictures help reduce GOP flickers. A GOP flicker is a gap in the continuity of picture quality between GOPs. Because a B picture can refer to pictures from previous and the following GOPs, it can blend two pictures from two adjacent GOPs and thereby smooth the gap on the GOP boundary in the B picture. This GOP smoothing effect dramatically improves the subjective quality of GOP transitions, and thereby reduces inter-GOP flicker.

2.2 B Pictures in an Interlaced Picture

Refer now to FIG. 3, which shows how interlaced pictures may be encoded 300. In an interlaced picture, each interlaced frame 302 comprises two interleaving fields 304 (an even 306 and an odd 308 field).

Often each interleaved field is encoded independently as half (vertical) sized pictures, or fields, thereby processing the even field 306 and the odd field 308 into a respective encoded even field 310 and an encoded odd field 312. These encoded even fields 310 and encoded odd fields 312 are interleaved again for display. Codecs such as H.264 may use different sets of reference pictures for the even field and odd field.

Figure 4:
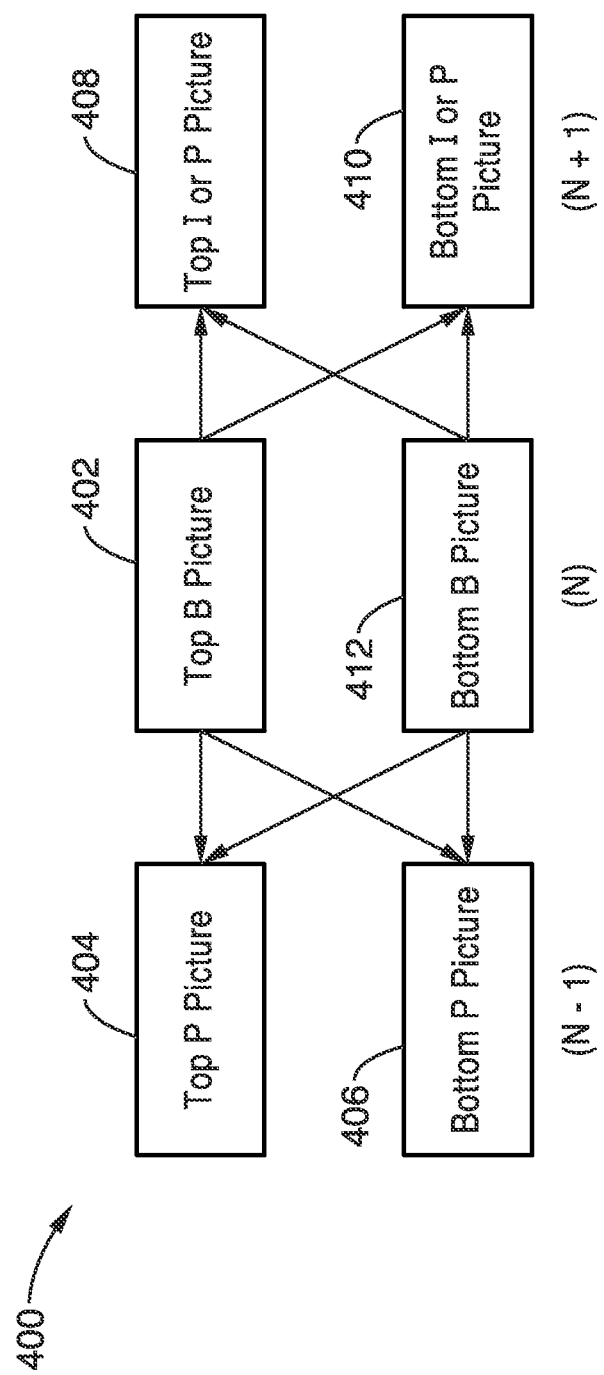
FIG. 4 is a chart showing the reference structures for the conventional B picture.

Refer now to FIG. 4, which shows reference pictures used in conventional B picture encoding 400. In conventional approaches, each of the top and bottom pictures of a B picture of frame (N) may refer to both the previous and the following pictures as references. For instance, the top B picture of frame (N) 402 may rely on the top P picture 404 or the bottom P picture 406 from the (N−1) frame as well as the top I or P picture 408 or the bottom I or P picture 410 from frame (N+1). Similarly, the bottom B picture of frame (N) 412 may also rely on the top P picture 404 or the bottom P picture 406 from the (N−1) frame as well as the top I or P picture 408 or the bottom I or P picture 410 from frame (N+1). This involves a great deal of computational complexity, with a consequent decrease of performance.

3. The Problem

While Bi prediction and B pictures do improve coding efficiency and reduce GOP flicker, they require additional computation when compared with unidirectional prediction (P pictures).

First, to create a Bi-directional block, at least two motion compensated pictures have to be prepared using two motion vectors and two reference pictures, as described previously in FIG. 4 above. Then, those two pictures are averaged or weighted averaged pixel by pixel. This means it requires two times more computation than unidirectional prediction.

Second, in modern codecs such as VC1 and H.264, complicated procedures are necessary to efficiently encode the motion vectors and the weights. Therefore, the complexity of B pictures is much higher than that of P pictures.

4. Bi-Directional Prediction Emulation for Interlace Pictures

The methods taught here achieve the benefit of Bi directional pictures without pixel averaging and without complicated motion vector determination. The methods simply arrange the reference picture structures for interlaced B pictures.

In one embodiment, the method arranges the reference structure of B pictures so that the top field only refers to succeeding pictures, while the bottom field only refers to the preceding pictures (as shown in the FIG. 5A below).

Figure 5A:
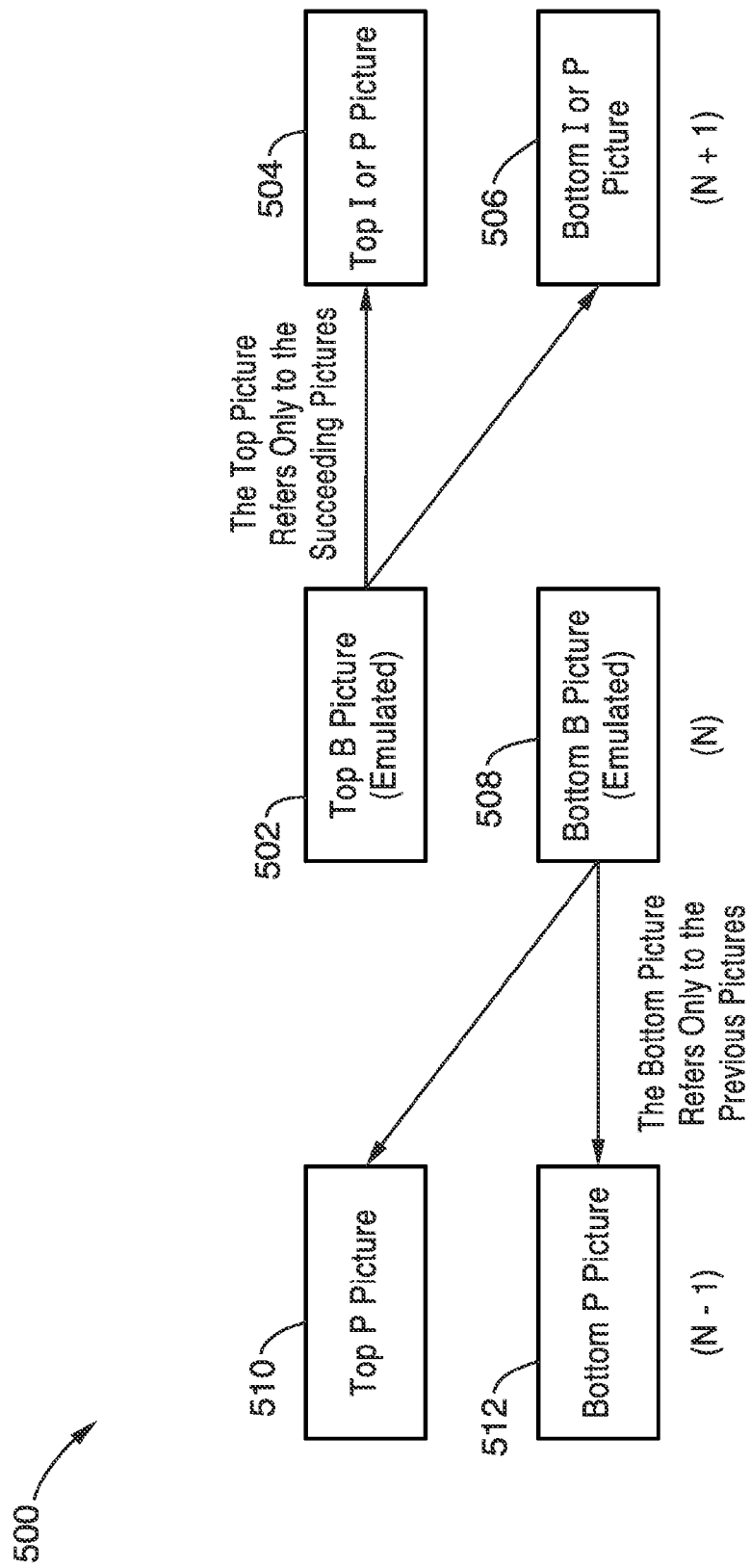
FIG. 5A is a chart of one embodiment of the B picture reference structure.

Refer now to FIG. 5A, which describes one embodiment 500 of the methods taught here. Here, the top B picture of frame (N) 502 is emulated using only the previously encoded subsequent top I or P picture 504 of frame (N+1) and the bottom I or P picture of frame (N+1) 506. On the other hand, the bottom B picture of frame (N) 508 is determined only from the preceding pictures of the top P picture of frame (N−1) 510 and the bottom P picture of frame (N−1) 512. Especially on a GOP boundary, this means the top B picture of frame (N) 502 and the bottom picture of frame (N) 508 may have very different characteristics.

Figure 5B:
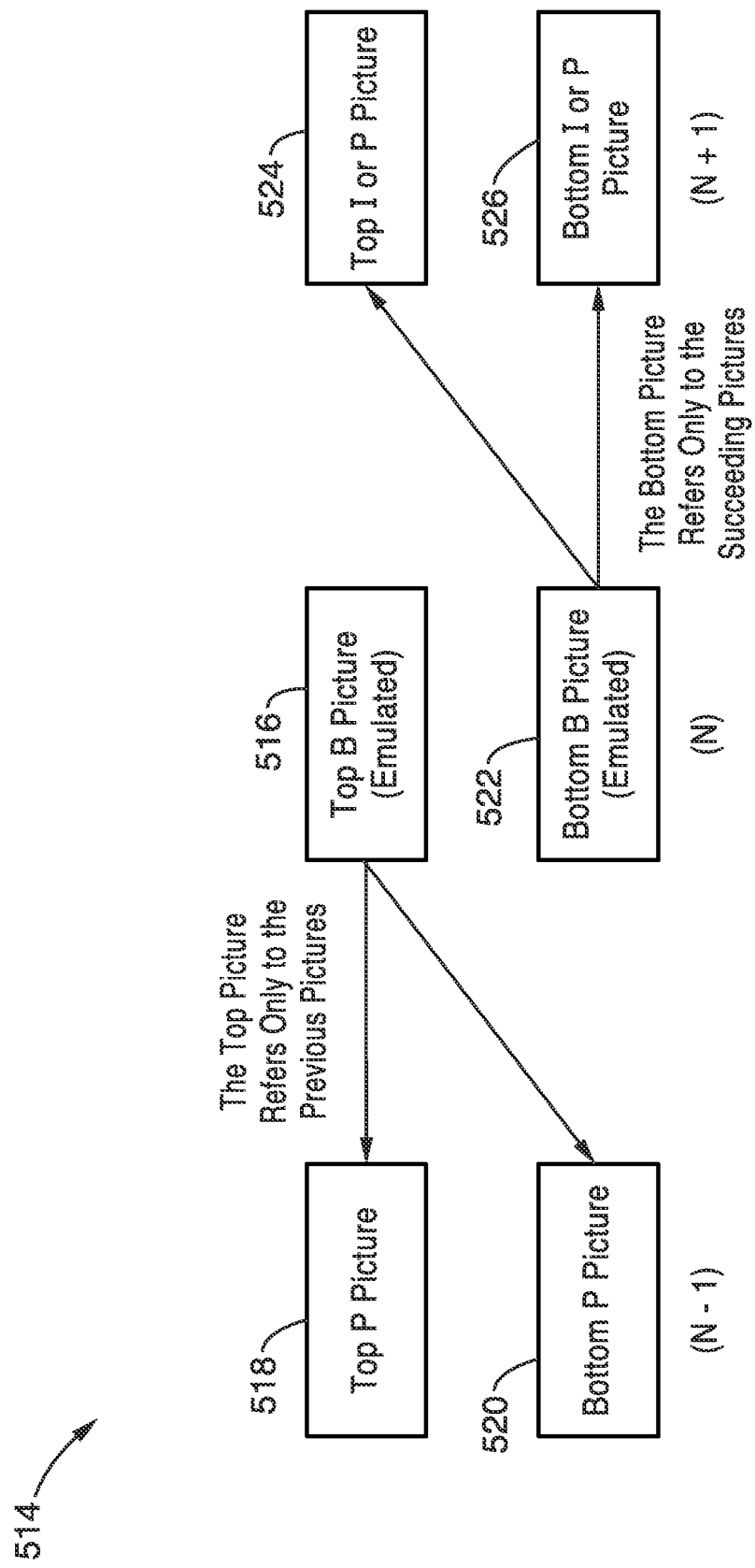
FIG. 5B is a chart of an alternative embodiment of the B picture reference structure.

Refer now to FIG. 5B, which shows an alternate embodiment 514 where the top B picture of frame (N) 516 may depend only on the preceding top P picture of frame (N−1) 518 and the bottom P picture of frame (N−1) 520. The corresponding bottom B picture of frame (N) 522 would then depend only on the subsequent top I or P picture 524 of frame (N+1) and the bottom I or P picture 526 of frame (N+1).

Since those fields are interleaved upon display by display devices, this achieves an effect similar to conventional B pictures that average and blend previous and succeeding pictures.

5. Benefits

In the methods described here, each field is encoded as a unidirectional picture. Each (sub)block uses only one motion vector and a reference picture. Therefore, pixel averaging is not required. Each field is encoded in basically the same way as normal P pictures. There is no need to use complex and computationally intensive derivations of motion vectors.

If the algorithm presented above is implemented in hardware, it results in smaller gate sizes and lower power consumption. If implemented in software, less computation is required.

6. Output

Figure 6:
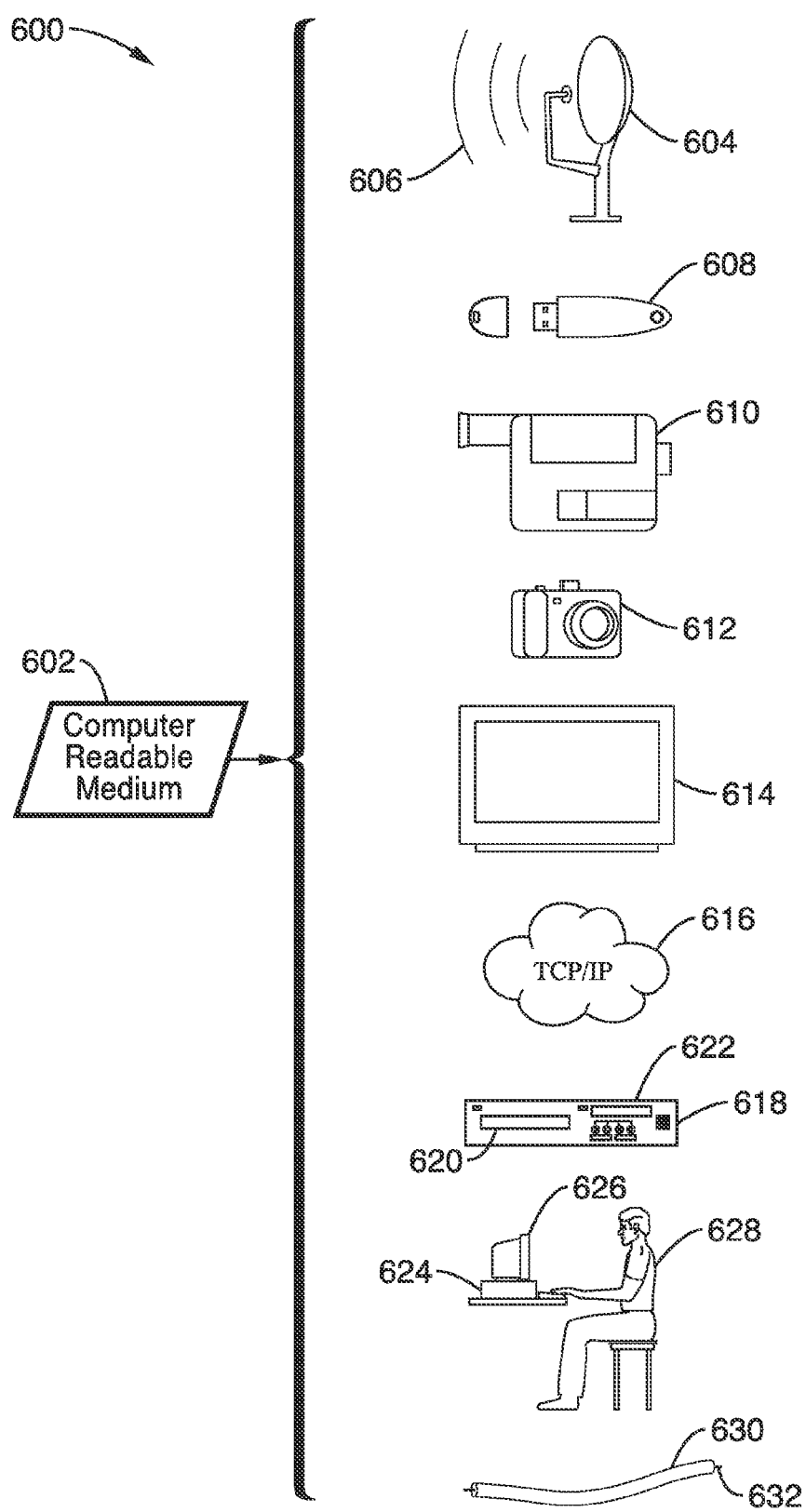
FIG. 6 is a diagram of various computer readable media usable as an output device from a computer readable medium.

Refer now to FIG. 6, which is a diagram 600 of the various output devices capable of reading a computer readable medium 602 that may be used as output of a video stream comprising emulated B pictures according to the teachings of this invention. Here, a data stream containing output from the Bi prediction method and apparatus described above may be stored on the computer readable medium 602, which is then connected (in a data transfer manner) to a microwave transmitter 604 for propagation through microwaves 606 to a distant connection. Similarly, and not shown, the data may be transmitted to remote receivers. The data may be stored on a memory device faster or slower than the depicted USB storage device 608, as well as stored on a digital or analog recording medium exemplified as a high definition video recorder 610, or a digital camera 612. Similarly, the data may be displayed, with or without further processing, on a graphical device such as a plasma or liquid crystal display 614. The data may be transmitted through a network 616, which may be wireless, or may use TCP/IP or other interconnection techniques to any other device in this FIG. 6. Still another output of the data may be to a multiple media device 618, which may have a VHS video recorder 620, or a DVD recorder 622. Yet another output of the data may be to a computer 624 that may or may not be connected to a display device 626, to be ultimately viewed by a person 628. The computer 624 may itself have a wide variety of computer readable media available for subsequent secondary output of the data. Finally, the data may be transmitted through a wired connection 630, which may have one or more conductors 632 of electromagnetic information (electronic or optical), ultimately being transmitted to one or more of the devices present in this FIG. 6.

From the foregoing description it can be seen the present invention can be embodied in various forms, including but not limited to the following.

1. An apparatus that emulates a B frame, comprising: an image processor; said image processor configured for processing sequential frames comprising a previous and a subsequent frame; said image processor configured to emulate a B frame from said previous and subsequent frames.

2. The apparatus of embodiment 1, wherein data is selected from the previous and subsequent frames to emulated the B frame.

3. The apparatus of embodiment 2, wherein said data is selected from the sequential frames without carrying out an operation selected from the group of operations consisting of averaging, adding, subtracting, multiplying, dividing, and combinations of the foregoing.

4. The apparatus of embodiment 2: wherein a bottom field of the B frame is emulated from a bottom field of the previous frame; and wherein a top field of the B frame is emulated from a top field of the subsequent frame.

5. The apparatus of embodiment 2: wherein a bottom field of the B frame is emulated from a bottom field of the subsequent frame; and wherein a top field of the B frame is emulated from a top field of the previous frame.

6. The apparatus of embodiment 2: wherein the previous and subsequent frames are interlaced with an even and an odd field; wherein an odd field of the interlaced B frame is emulated from an odd field of the interlaced previous frame; and wherein an even field of the interlaced B frame is emulated from an even field of the interlaced subsequent frame.

7. The apparatus of embodiment 2: wherein the previous and subsequent frames are interlaced with an even and an odd field; wherein an odd field of the interlaced B frame is emulated from an odd field of the interlaced subsequent frame; and wherein an even field of the interlaced B frame is emulated from an even field of the interlaced previous frame.

8. The apparatus of embodiment 2, wherein the B frame is output to a computer readable medium.

9. The apparatus of embodiment 8, wherein the computer readable medium is output to a user.

10. The apparatus of embodiment 2, wherein the previous and the subsequent frames are selected from a group of frames consisting of an I frame and a P frame.

11. An apparatus for emulating a B frame, comprising: an image processor; said image processor configured for emulating a B frame from data selected in a previous frame and a subsequent frame; wherein said previous frame and said subsequent frame are selected from a group of frames consisting of an I frame and a P frame.

12. The apparatus of embodiment 11, wherein said creating a B frame does not require a calculation of motion vectors.

13. The apparatus of embodiment 11, wherein the B frame, the previous frame, and the subsequent frame each comprise a top field and a bottom field.

14. An apparatus for emulating a B frame, comprising: an image processor; said image processor configured for emulating a B frame between two sequential frames.

15. The apparatus of embodiment 14, wherein data is selected from the sequential frames for emulating the B frame.

16. The apparatus of embodiment 15, wherein said data is selected from the sequential frames without carrying out an operation selected from a set of operations consisting of averaging, adding, subtracting, multiplying, dividing, and combinations of the foregoing.

17. The apparatus of embodiment 14: wherein the sequential frames comprise a previous I frame and a subsequent I frame; wherein a bottom field of the B frame is emulated from a bottom field of the previous frame; and wherein a top field of the B frame is emulated from a top field of the subsequent frame.

18. The apparatus of embodiment 14: wherein the sequential frames comprise a previous frame and a subsequent frame; wherein a bottom field of the B frame is emulated from a bottom field of the subsequent frame; and wherein a top field of the B frame is emulated from a top field of the previous frame.

19. The apparatus of embodiment 14: wherein the two sequential I frames comprise a previous frame and a subsequent frame; wherein the previous, subsequent, and B frames are interlaced with an odd and an even field.

20. The apparatus of embodiment 19: wherein an odd field of the interlaced B frame is emulated from an odd field of the interlaced previous frame; and wherein an even field of the interlaced B frame is emulated from an even field of the interlaced subsequent frame.

21. The apparatus of embodiment 19: wherein an odd field of the interlaced B frame is emulated from an odd field of the interlaced subsequent frame; and wherein an even field of the interlaced B frame is emulated from an even field of the interlaced previous frame.

22. The apparatus of embodiment 14, wherein said B frame is output to a computer readable medium.

23. The apparatus of embodiment 14, wherein the B frame is output to a human.

24. The apparatus of embodiment 14, wherein the previous and the subsequent frames are selected from a group of frames consisting of an I frame and a P frame.

25. An image processor, comprising: input circuitry capable of receiving and decoding an input previous frame and an input subsequent frame; and output circuitry capable of emulating and outputting a B frame based on said previous and subsequent frames.

26. The image processor of embodiment 25, wherein the B frame is coded without calculation of motion vectors.

27. The image processor of embodiment 25, wherein the previous frame and the subsequent frame each comprise a top field and a bottom field encoded as independent pictures.

28. The image processor of embodiment 27, wherein the B frame comprises a selection of data from the previous and subsequent frames.

29. The image processor of embodiment 28, wherein the selection of data from the two sequential frames is performed without operations selected from a set of operations consisting of averaging, adding, subtracting, multiplying, dividing, and combinations of the foregoing.

30. The image processor of embodiment 25: wherein a bottom field of the B frame is emulated from a bottom field of the previous frame; and wherein a top field of the B frame is emulated from a top field of the subsequent frame.

31. The image processor of embodiment 25: wherein a bottom field of the B frame is emulated from a bottom field of the subsequent frame; and wherein a top field of the B frame is emulated from a top field of the previous frame.

32. The image processor of embodiment 25: wherein the previous, subsequent, and B frames are interlaced with an even and an odd field; wherein an odd field of the interlaced B frame is emulated from an odd field of the interlaced previous frame; and wherein an even field of the interlaced B frame is emulated from an even field of the interlaced subsequent frame.

33. The image processor of embodiment 25: wherein an odd field of the interlaced B frame is emulated from an odd field of the interlaced subsequent frame; and wherein an even field of the interlaced B frame is emulated from an even field of the interlaced previous frame.

34. The image processor of embodiment 25, wherein said output circuitry generates an output to a computer readable medium.

35. The image processor of embodiment 25, wherein the previous and the subsequent frames are selected from a group of frames consisting of an I frame and a P frame.

36. A method of creating a B frame, comprising: providing an image processor; providing a previous and a subsequent frame, selected from a group of frames consisting of: an I frame, and a P frame; and creating, on the image processor, a B frame from data selected in the previous and subsequent frame.

37. The method of embodiment 36, wherein said creating a B frame does not require calculating motion vectors.

38. The method of embodiment 36, wherein the B frame, the previous frame, and the subsequent frame each comprise a top field and a bottom field.

39. A method for emulating a B frame, comprising: providing an image processor; providing two sequential I frames, comprising: one previous and one subsequent frame; positioning a B frame to be emulated between the two sequential I frames; and emulating, with the image processor, the B frame from the two sequential I frames.

40. The method of embodiment 39, further comprising selecting data from the two sequential frames to form the B frame.

41. The method of embodiment 40, wherein said selecting data from the two sequential frames step is performed without operations selected from a set of operations comprising: averaging, adding, multiplying, dividing, subtracting, and combinations of the foregoing.

42. The method of embodiment 39, wherein said emulating the B frame comprises: forming a bottom field of the B frame from a bottom field of the previous frame; and forming a top field of the B frame from a top field of the subsequent frame.

43. The method of embodiment 39, wherein said emulating the B frame comprises: forming a bottom field of the B frame from a bottom field of the subsequent frame; and forming a top field of the B frame from a top field of the previous frame.

44. The method of embodiment 39, wherein the previous, subsequent, and B frames are interlaced with an odd and an even field.

45. The method of embodiment 44, wherein said emulating the B frame comprises: forming an odd field of the interlaced B frame from an odd field of the interlaced previous frame; and forming an even field of the interlaced B frame from an even field of the interlaced subsequent frame.

46. The method of embodiment 39, wherein said emulating the B frame comprises: forming an odd field of the interlaced B frame from an odd field of the interlaced subsequent frame; and forming an even field of the interlaced B frame from an even field of the interlaced previous frame.

47. The method of embodiment 39, wherein said emulating the B frame comprises outputting the B frame to a computer readable medium.

48. The method of embodiment 39, wherein said emulating the B frame comprises outputting the B frame to a human.

49. The method of embodiment 39, wherein the previous and the subsequent frames are selected from a group of frames consisting of: an I frame, and a P frame.

Embodiments of the present invention may be described with reference to flowchart illustrations of methods and systems according to embodiments of the invention. These methods and systems can also be implemented as computer program products. In this regard, each block or step of a flowchart, and combinations of blocks (and/or steps) in a flowchart, can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts support combinations of means for performing the specified functions, combinations of steps for performing the specified functions, and computer program instructions, such as embodied in computer-readable program code logic means, for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s).

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus that constructs a B frame, comprising; an image processor;
    said image processor configured for inputting sequential frames comprising a previous and a subsequent frame;
    said image processor configured for constructing a B frame from said previous and subsequent frames;
    wherein the B frame is constructed from both of the previous and subsequent frames without calculation of motion vectors.

2. The apparatus of claim 1, wherein data is selected from the previous and subsequent frames to construct the B frame.

3. The apparatus of claim 2, wherein said data is selected from both of the sequential frames without carrying out an operation selected from the group of operations consisting of averaging, adding, subtracting, multiplying, dividing, and combinations of the foregoing.

4. The apparatus of claim 2:
    wherein a bottom field of the B frame is constructed from a bottom field of the previous frame; and
    wherein a top field of the B frame is constructed from a top field of the subsequent frame.

5. The apparatus of claim 2:
    wherein a bottom field of the B frame is constructed from a bottom field of the subsequent frame; and
    wherein a top field of the B frame is constructed from a top field of the previous frame.

6. The apparatus of claim 2:
    wherein the previous and subsequent frames are interlaced with an even and an odd field;
    wherein an odd field of the interlaced B frame is constructed from an odd field of the interlaced previous frame; and
    wherein an even field of the interlaced B frame is constructed from an even field of the interlaced subsequent frame.

7. The apparatus of claim 2:
    wherein the previous and subsequent frames are interlaced with an even and an odd field;
    wherein an odd field of the interlaced B frame is constructed from an odd field of the interlaced subsequent frame; and
    wherein an even field of the interlaced B frame is constructed from an even field of the interlaced previous frame.

8. The apparatus of claim 2, wherein the B frame is output to a non-transitory computer readable medium.

9. The apparatus of claim 8, wherein the B frame is output to a user.

10. The apparatus of claim 2, wherein the previous and the subsequent frames are selected from a group of frames consisting of an I frame and a P frame.

11. An apparatus for emulating a B frame, comprising: an image processor;
    said image processor configured for constructing a B frame from data selected in both a previous frame and a subsequent frame;
    wherein said previous frame and said subsequent frame are selected from a group of frames consisting of an I frame and a P frame:
    wherein said constructing a B frame does not require a calculation of motion vectors.

12. The apparatus of claim 11, wherein the B frame, the previous frame, and the subsequent frame each comprise a top field and a bottom field.

13. An apparatus for emulating a B frame, comprising: an image processor;
    said image processor configured for constructing a B frame between two sequential frames;
    wherein data is selected from both of the sequential frames for constructing the B frame without carrying out an operation selected from a set of operations consisting of averaging, adding, subtracting, multiplying, dividing, and combinations of the foregoing.

14. The apparatus of claim 13:
    wherein the sequential frames comprise a previous I frame and a subsequent I frame;
    wherein a bottom field of the B frame is constructed from a bottom field of the previous frame; and
    wherein a top field of the B frame is constructed from a top field of the subsequent frame.

15. The apparatus of claim 13:
    wherein the sequential frames comprise a previous frame and a subsequent frame;

wherein a bottom field of the B frame is constructed from a bottom field of the subsequent frame; and wherein a top field of the B frame is constructed from a top field of the previous frame.

16. The apparatus of claim 13:

wherein the two sequential I frames comprise a previous frame and a subsequent frame;

wherein the previous, subsequent, and B frames are interlaced with an odd and an even field.

17. The apparatus of claim 16:

wherein an odd field of the interlaced B frame is constructed from an odd field of the interlaced previous frame; and wherein an even field of the interlaced B frame is constructed from an even field of the interlaced subsequent frame.

18. The apparatus of claim 16:

wherein an odd field of the interlaced B frame is constructed from an odd field of the interlaced subsequent frame; and wherein an even field of the interlaced B frame is constructed from an even field of the interlaced previous frame.

19. The apparatus of claim 13, wherein B frame is output to a non-transitory computer readable medium.

20. The apparatus of claim 13, wherein the B frame is output to a human.

21. The apparatus of claim 13, wherein the previous and the subsequent frames are selected from a group of frames consisting of an I frame and a P frame.

22. An image processor, comprising:

input circuitry capable of receiving and decoding an input previous frame and an input subsequent frame; and output circuitry capable of constructing and outputting a B frame based on both of said previous and subsequent frames without calculation of motion vectors.

23. The image processor of claim 22, wherein the B frame is coded without calculation of motion vectors.

24. The image processor of claim 22, wherein the previous frame and the subsequent frame each comprise a top field and a bottom field encoded as independent pictures.

25. The image processor of claim 24, wherein the B frame comprises a selection of data from the previous and subsequent frames.

26. The image processor of claim 25, wherein the selection of data from the two sequential frames is performed without operations selected from a set of operations consisting of averaging, adding, subtracting, multiplying, dividing, and combinations of the foregoing.

27. The image processor of claim 22:

wherein a bottom field of the B frame is constructed from a bottom field of the previous frame; and wherein a top field of the B frame is constructed from a top field of the subsequent frame.

28. The image processor of claim 22:

wherein a bottom field of the B frame is constructed from a bottom field of the subsequent frame; and wherein a top field of the B frame is constructed from a top field of the previous frame.

29. The image processor of claim 22: wherein the previous, subsequent and B frames are interlaced with an even and an odd field;

wherein an odd field of the interlaced B frame is constructed from an odd field of the interlaced previous frame; and wherein an even field of the interlaced B frame is constructed from an even field of the interlaced subsequent frame.

30. The image processor of claim 22:

wherein an odd field of the interlaced B frame is constructed from an odd field of the interlaced subsequent frame; and wherein an even feild of the interlaced B frame is constructed from an even field of the interlaced previous frame.

31. The image processor of claim 22, wherein said output circuitry generates an output to a non-transitory computer readable medium.

32. The image processor of claim 22, wherein the previous and the subsequent frames are selected from a group of frames consisting of an I frame and a P frame.

* * * * *